Figure 1:
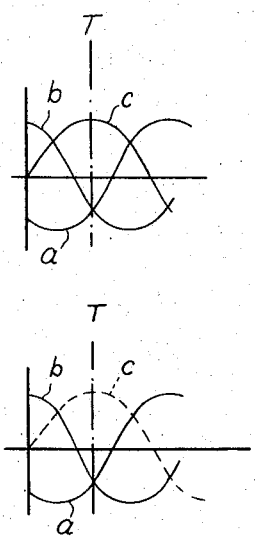

Jan. 24, 1967   B. B. DAIEN   3,300,650
POWER LINE FAILURE DETECTION SYSTEM
Filed April 12, 1963   2 Sheets-Sheet 1

INVENTOR:
BERNARD B. DAIEN
BY Frederick Breitenfeld
ATTORNEY

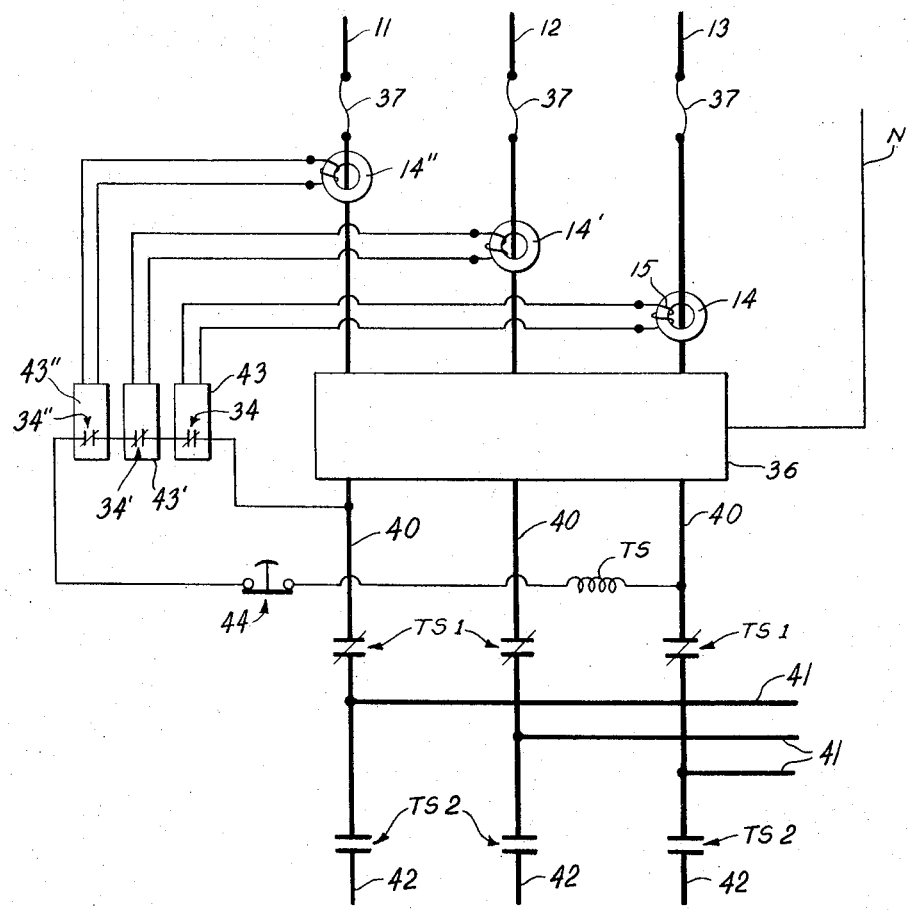

United States Patent Office 3,300,650
Patented Jan. 24, 1967

---

3,300,650
POWER LINE FAILURE DETECTION SYSTEM
Bernard B. Daien, Suffern, N.Y., assignor to Automatic Switch Company, Florham Park, N.J., a corporation of New York
Filed Apr. 12, 1963, Ser. No. 272,748
4 Claims. (Cl. 307—66)

This invention relates to electric power-failure detection devices. More particularly, it relates to such a device capable of detecting the failure of any phase of a multi-phase power line supplying a transformer having a Y-connected primary and all windings on a common core.

When a three-phase transformer of this type is operating at or near full load, a failure in any phase of the power line supplying the transformer will immediately be manifested by a voltage drop at the secondary side of the transformer. This drop may readily be detected, and the load may then be disconnected from the transformer, and if desired transferred to an auxiliary source of power, usually by means of an automatic transfer switch.

After disconnection of the load, it is important to know quickly which phase of the power supply has failed so that repairs can be effected. This information is not available, however, from measuring instruments, such as voltage-sensing relays, connected to the secondary side of the transformer. The reason is that loss of one phase on the primary side of a transformer does not produce a loss of the corresponding phase, or any other phase, on the secondary side. The two operative primary phases are able, when the transformer secondary is unloaded, to draw enonugh extra current to set up flux conditions which sustain secondary three-phase voltages at normal no-load levels. Thus, at no load, it is impossible to sense the loss of a phase in the power line supplying the primary with instruments connected to the secondary. Thus it frequently happens that while the transformer secondary is connected to a load, a sensing instrument on the secondary side will detect a failure on the primary side, initiate an automatic disconnection of the secondary from the load, and then under the no-load condition cease to detect any abnormality. This might bring about an undesirable premature reconnection of the secondary to the load. In any case it does not help to identify the primary phase in which the failure has occurred.

Inability to detect power line failure by instruments at the secondary side is not limited to no-load conditions on the transformer. As long as the load is below a certain fraction of full load, the two operative phases are capable of drawing enough extra current to maintain normal three-phase voltages at the secondary for the particular load involved. Consequently, instruments connected to the secondary will not detect the abnormal condition until a load is applied which requires more power than the two operating phases can supply.

It is an object of the present invention to overcome these and other problems attendant to the employment of a three-phase transformer of the character described by providing a method and means for immediately detecting the failure of any phase of the line supplying power to the primary even when the transformer secondary is only partially loaded or even completely unloaded.

Coordinately, it is an object of the invention to provide a means which will immediately indicate which phase has failed.

It is another object to provide a means which achieves these objectives without introducing any losses to the system being monitored.

It is a further object of the invention to provide means of the character described, admirably suited to control the operation of a transfer switch assembly for the purpose of automatically disconnecting a load from the transformer and reconnecting it to an alternate source of power when a failure in the power supply to the transformer occurs.

The present invention is predicated upon a realization of the fact that exciting current, i.e., current drawn by the transformer to magnetize the core, flows at all times in the power line supplying the transformer primary, even when there is no load connected to the secondary. Means are therefore, provided for individually detecting the presence or absence of exciting current in each phase winding of the primary. Obviously, when a phase of the power line fails, no exciting current will flow in the power conductor carrying that phase or in the corresponding phase winding of the transformer primary. This invention is predicated upon a practical harnessing of this circumstance to an immediate detection of such a failure and to an indication as to which particular phase has failed.

It is therefore still another object of the invention to provide a means which is sensitive enough to detect the presence or absence of exciting current in the power supply line but which is nevertheless unaffected by currents above the exciting current level, even maximum load currents.

To achieve the objectives set forth above, the present invention provides an auxiliary transformer associated with each phase conductor of the power line supplying the primary of the main transformer, each phase conductor serving as the primary of its respective auxiliary transformer. Preferably, the core of each auxiliary transformer is a toroid of magnetic material surrounding the conductor. A secondary wound on the auxiliary transformer core is connected through circuitry of special character to a signal circuit. The special circuit elements are so conceived as to be responsive to the presence or absence of at least exciting current in the power conductor for controlling the signal circuit accordingly, and to be completely unaffected by increases in current values above the value of exciting current. The signal circuit may be adapted, by means of a relay, to control the operation of a transfer switch assembly.

Other objects and advantages of the invention will be apparent from the following description in which reference is made to the accompanying drawings.

Figure 3:
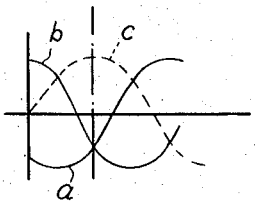
Figure 2:
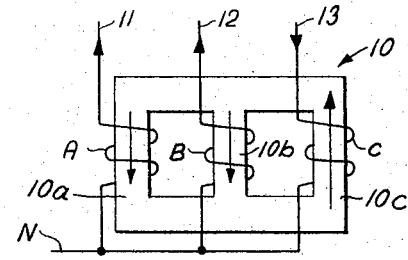
Figure 4:
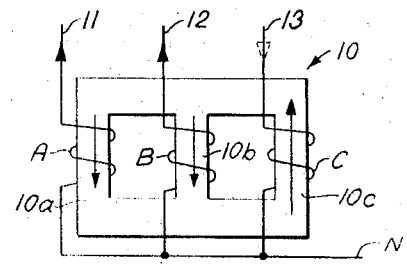
Figure 5:
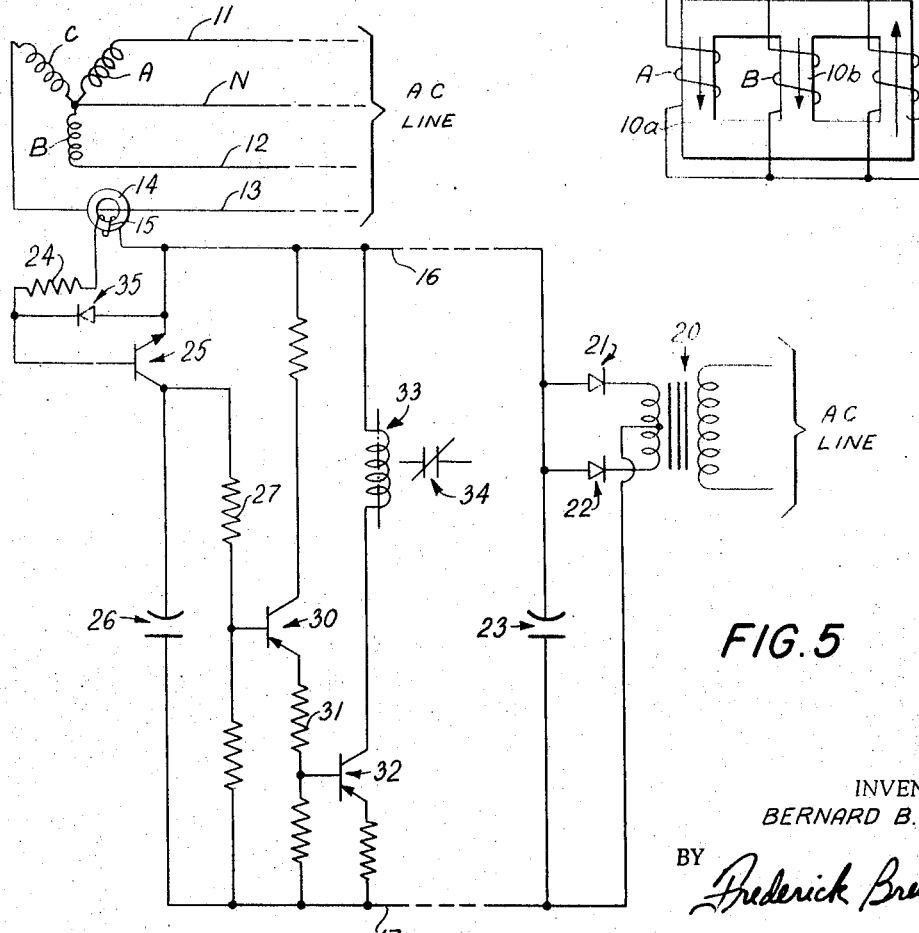

In the drawings:
FIG. 1 is a diagrammatic representation of three-phase alternating current;
FIG. 2 is a diagrammatic view of a transformer having a Y-connected primary and a common core for the windings, the secondary not being shown;
FIG. 3 is a representation similar to FIG. 1 after one phase has failed;
FIG. 4 is a view similar to FIG. 2;
FIG. 5 is a fragmentary diagrammatic view of a three-phase power line supplying a Y-connected primary and provided with a detection arrangement according to the present invention; and
FIG. 6 is a diagrammatic view of the transformer installation and detection arrangement combined with a transfer switch assembly.

FIG. 1 represent the output of a three-phase power source supplying phases "$a$," "$b$" and "$c$" to the transformer shown in FIG. 2. For the sake of clarity, the secondary windings of the transformer are not shown. The three-phase windings A, B and C of the transformer primary are wye-connected and wound on a common core 10. The windings are connected to the power source by power conductors 11, 12 and 13, respectively, and a neutral conductor N. Phase "$a$" of the power source supplies the winding A, phase "$b$" supplies winding B, and phase "$c$" supplies winding C.

At an arbitrarily chosen instant of time T (see FIG. 1) current flows in each of the primary windings in the directions indicated by the arrows at the top of FIG. 2. These currents produce magnetic flux in the legs 10a, 10b and 10c of the core 10 in the directions indicated by the arrows superimposed on the legs. The direction of the current in each winding alternates with time, of course, whereby the direction of the magnetic flux produced in its respective leg alternates thereby serving to induce an alternating current in the secondary winding.

If at the instant of time T, one of the phases of the power supply, say the phase "c," had failed, as indicated in FIG. 3, the winding C would, of course, receive no current, as indicated in FIG. 4. Nevertheless, the currents present in the winds A and B serve to produce magnetic flux in the leg 10c of the core as well as their respective legs 10a and 10b. The flux in leg 10c, in turn, induces a current in its respective secondary winding. Thus, it may be seen that although one phase of the primary side of the transformer fails, the flux produced in the core by the two operative phases serves to sustain the secondary phase corresponding to the inoperative primary phase. What is more, that secondary phase will have the same phase relationship to the other phases as it would have had if its corresponding primary phase had not failed.

Where a phase of the power line supplying the transformer is out and no load or a load below a certain fraction of full load is connected to the secondary, the two operative primary phases can draw enough extra current to maintain normal no-load or partial load voltages at the secondary. Thus, under these conditions, detection equipment connected to the secondary is incapable of sensing loss of a primary phase.

FIG. 5 illustrates a means according to the invention for immediately detecting the failure of one phase of the power supply to the transformer, even when the secondary is unloaded. An auxiliary transformer and associated circuitry is associated with each power conductor of the supply line. In FIG. 5, only the auxiliary transformer and associated circuitry associated with the conductor 13 is shown for the sake of simplicity, but it is to be understood that an identical transformer and circuitry are associated with each of the other power conductors 11 and 12. A toroid or donut 14 of magnetic material constituting the core of the auxiliary transformer surrounds the conductor 13, which acts as the primary. The toroid and conductor are, of course, insulated from each other. The toroid 14 carries a secondary winding 15 supplying current to a transistorized circuit of special character.

The circuit is connected between a pair of Direct Current lines 16 and 17 which may be supplied with power from any convenient D.C. source. In the present example, a transformer 20 is employed having its primary connected to the Alternating Current source, and its secondary connected between the lines 16 and 17 through a pair of diodes 21 and 22 and a capacitor 23.

One end of the winding 15 on the toroid 14 is connected directly to the D.C. line 16. The other end is connected through a resistor 24, a transistor 25, and a capacitor 26 to the line 17. Current from the winding 15 flows through the resistor 24 to the transistor 25. The resistor serves a very important function which is described below. As the current flows through the emitter-base junction of the transistor 25, it is converted to amplified pulsating Direct Current in the collector of the transistor. The capacitor 26 serves to smooth out these pulsations. The resulting pulsating D.C. flows through a resistor 27 to a transistor 30 connected, through suitable resistors, between the lines 16 and 17. Transistor 30 further increase the amplitude of the pulsating current which then flows through a resistor 31 to a power transistor 32. The transistor 32 is connected in series with the coil 33 of a relay betwen the line 16 and 17. When the current reaches the transistor 32, it causes the latter to complete a circuit from line 16, through coil 33 and transistor 32 to line 17, thus energizing the relay coil 33. As a result, the normally open contacts 34 of the relay close. These contacts may be used to control a signal circuit or for any other desired purpose.

The circuit just described is so conceived that if exciting current is flowing in conductor 13, it will produce sufficient current in the secondary 15 to cause energization of the coil 33 and engagement of contacts 34. If exciting current ceases to flow in conductor 13, the relay coil 33 will be deenergized and the contacts 34 will open. Thus, FIG. 5 illustrates means capable of detecting the presence or absence of exciting current in the conductors supplying power to the transformer primary. In other words, the device illustrated individually monitors the conductors of a multiphase power line supplying the primary of a transformer, and senses the presence or absence of exciting current in those conductors and hence in the transformer windings which they supply.

Furthermore, as the current in the conductor 13 rises above the level of exciting current, even to maximum load current, the resistor 24 limits the current flowing to the base of the transistor 25, and a diode 35 prevents excessive reverse voltage from being applied to the base of the transistor 25, thereby preventing damage to the circuit elements. Throughout the rise in current, of course, the relay coil 33 remains energized. Thus, it may be seen, that the present detection means, although sensitive to exciting current, is completely unaffected by current flow in the power conductors above the value of exciting current.

FIG. 6 illustrates one environment in which the present detection means may be employed. The power conductors 11, 12 and 13 are shown supplying a transformer, indicated by the box 36, of the type illustrated in FIG. 2, through the fuses 37. Connected to the secondary of the transformer are the conductors 40 and a neutral conductor N extends from the transformer to the power source. Conductors 41 extend from the conductors 40 to a load (not shown), and conductors 42 extend from the load conductors 41 to an alternate or emergency source of power (not shown) to be connected to the load should the main power source fail.

The toroid 14 surrounds the conductor 13, and similar toroids 14' and 14" surround the conductors 12 and 11 respectively. The secondary winding 15 on the toroid 14 is connected to a box 43 intended to indicate the circuitry shown in FIG. 5 and described above. For the sake of simplicity, the D.C. source for powering the transistors and coil 33 is not shown. Within the box, the contacts 34 controlled by the coil 33 (FIG. 5) are shown. Each of the other boxes, 43' and 43", is intended to represent circuitry identical to that shown in FIG. 5, and these circuits include contacts 34', 34", respectively, similar to contacts 34. These contacts are all shown closed, i.e., their respective coils are assumed to be energized.

A circuit is provided extending from one of the secondary conductors 40, through the contacts 34, 34' and 34" in series, a normally closed test switch 44, and the coil TS of a transfer switch, to another one of the secondary conductors 40. The coil TS controls the actuation of three normally open switches TS1 located between the secondary conductors 40 and the load conductors 41, and three normally closed switches TS2 located between the emergency source conductors 42 and the load conductors 41. The coil TS is shown energized so that the load is connected to the main power source and disconnected from the emergency source. As long as at least exciting current flows in each conductor 11, 12 and 13, the contacts 34, 34' and 34" will remain closed maintaining the transfer switch coil TS in energized condition.

However, should any phase of the main power supply fail, the transfer switch will cause the load to be disconnected from the main source and connected to the emergency or alternate source. For example, should the fuse 37 associated with the conductor 13 blow, no current, not even exciting current, will flow in conductor 13. As a result, the relay coil 33 (FIG. 5) will be deenergized and the contacts 34 will open thus deenergizing the transfer switch coil TS. Consequently, the switches TS1 will open, and the switches TS2 will close. What is more, a simple inspection of the contacts 34, 34' and 34" to determine which pair is open will immediately indicate which phase of the power supply has failed.

Should a more positive signal be desired for indicating which phase has failed, a normally closed pair of contacts may be associated with each relay coil 33 and placed in a circuit with a source of electric power and a lamp. A separate circuit of this type should be provided for each pair of contacts. Upon deenergization of one of the coils 33, its associated normally closed contacts will close and cause the lamp to be lit indicating that the phase associated with that patricular lamp has failed.

If it is desired to test the operativeness of the transfer switch at a time when the main power source is functioning properly, the test switch 44 is opened.

It will be appreciated, in view of the above description, that the present invention provides means which not only detect failure of a phase of a multiphase power supply, but indicate which particular phase has failed. In addition, it is clear that the present detection device introduces no losses into the system being monitored since there is no direct connection to the system.

The invention has been shown and described in preferred form only, and by way of example, and many variations may be made in the invention which will still be comprised within its spirit. It is to be understood, therefore, that the invention is not limited to any specific form or embodiment except insofar as such limitations are included in the appended claims.

What is claimed is:

1. In combination, a three-phase transformer having a wye-connected primary and a common core for the windings of said primary, a three-phase power line supplying power to said primary, the primary of an auxiliary transformer surrounding each phase conductor of said power line, a secondary winding on said toroid, an amplifier connected to said secondary winding, means for limiting current flow to said amplifier, a transistorized switching arrangement, said amplifier being responsive to voltage induced in said secondary winding to provide a signal to said switching arrangement, and a signal circuit adapted to be controlled by the switching arrangement, said amplifier and signal circuit being so related that the signal circuit responds selectively to the presence or absence in said conductor of current at least equal to the exciting current of said transformer.

2. In combination,
   (a) a three-phase transformer having a wye-connected primary, a secondary, and a common core for the windings of said primary and secondary,
   (b) a three-phase power line supplying power to said primary, and an alternate three-phase source of power,
   (c) an electric circuit connecting said secondary to a load,
   (d) an electric circuit connecting said alternate source to said load,
   (e) a transfer switch assembly comprising a coil, a first switch in circuit (c), and a second switch in circuit (d), said first switch being closed and said second switch open when said coil is energized,
   (f) an auxiliary transformer associated with each phase conductor of said power line, said conductor serving as the primary of said auxiliary transformer, and an auxiliary secondary forming part of said auxiliary transformer,
   (g) a relay having a coil and a pair of normally open contacts, a circuit connecting said relay coil to said auxiliary secondary, and means in said circuit responsive to the presence of at least exciting current in said conductor for energizing said relay coil to close said contacts, said relay coil being deenergized and said contacts opened when the current in said conductor falls below the exciting current,
   (h) a circuit including said transfer switch coil and said three pairs of relay contacts in series,
   (i) whereby upon the failure of any phase of said power line, the relay contacts associated with that phase conductor will open and cause said transfer switch to disconnect said load from said transformer secondary and connect said load to said auxiliary source of power.

3. The combination defined in claim 2 wherein each relay is provided with an additional pair of normally closed contacts, and a circuit including said additional contacts and a signal, whereby upon failure of any phase of said power line, said additional contacts associated with that phase conductor will close and energize said signal thereby indicating which phase of said power line has failed.

4. The combination defined in claim 2 wherein the core of each of said auxiliary transformers is a toroid of magnetic material surrounding said conductor, and said auxiliary secondary is a winding on said toroid.

References Cited by the Examiner
UNITED STATES PATENTS

| | | | |
|---|---|---|---|
| 405,572 | 6/1889 | Loomis | 340—255 X |
| 1,270,894 | 8/1918 | Steinmetz. | |
| 1,313,072 | 8/1919 | Creighton | 317—27 |
| 2,486,305 | 10/1949 | Mahnke | 307—64 |
| 2,590,611 | 3/1952 | Gunter | 307—64 |
| 2,845,593 | 7/1958 | Lowry | 322—8 X |
| 2,930,938 | 3/1960 | Tapper | 317—46 |
| 2,959,717 | 11/1960 | Conger | 317—31 |
| 2,971,146 | 2/1961 | Diebold | 317—434 |
| 3,045,168 | 7/1962 | Fellendorf | 321—14 |
| 3,165,671 | 1/1965 | Mintz | 317—46 X |
| 3,187,225 | 6/1965 | Mayer. | |
| 3,202,875 | 8/1965 | Bateman | 317—27 X |
| 3,223,889 | 12/1965 | Schweitzer | 317—27 X |

ORIS L. RADER, *Primary Examiner.*

T. J. MADDEN, *Assistant Examiner.*